(12) United States Patent
Mudulodu

(10) Patent No.: US 10,827,451 B2
(45) Date of Patent: Nov. 3, 2020

(54) METHOD AND SYSTEM OF LOCATING A WIRELESS DEVICE USING RECEIVED SIGNAL STRENGTHS

(71) Applicant: Silicon Laboratories Inc., Austin, TX (US)

(72) Inventor: Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/024,836

(22) Filed: Jun. 30, 2018

(65) Prior Publication Data
US 2020/0008168 A1 Jan. 2, 2020

(51) Int. Cl.
*H04W 64/00* (2009.01)
*H04B 17/318* (2015.01)
*H04W 16/28* (2009.01)

(52) U.S. Cl.
CPC .......... *H04W 64/00* (2013.01); *H04B 17/318* (2015.01); *H04W 16/28* (2013.01)

(58) Field of Classification Search
CPC .............................. H04W 64/00; H04B 17/318
See application file for complete search history.

(56) References Cited

U.S. PATENT DOCUMENTS

| | | | | |
|---|---|---|---|---|
| 5,274,386 A * | 12/1993 | Pellon | ........................ | G01S 3/30 342/379 |
| 2006/0087423 A1* | 4/2006 | Coronel | .................. | G01D 21/00 340/539.1 |
| 2008/0123602 A1* | 5/2008 | Beek | ..................... | H04B 7/0617 370/336 |
| 2011/0018766 A1* | 1/2011 | Steer | ......................... | G01S 1/14 342/368 |
| 2011/0110307 A1* | 5/2011 | Ko | ........................ | H04B 7/0669 370/328 |
| 2013/0288714 A1* | 10/2013 | Lipman | .................. | G01S 5/0263 455/456.1 |
| 2015/0133173 A1* | 5/2015 | Edge | ......................... | G01S 1/66 455/456.6 |
| 2015/0289147 A1* | 10/2015 | Lou | ....................... | H04B 7/0408 370/329 |
| 2016/0380743 A1* | 12/2016 | Rakib | .................... | H04L 5/0098 455/418 |
| 2017/0099091 A1* | 4/2017 | Martin | .................. | H04B 7/0615 |
| 2019/0079176 A1* | 3/2019 | Weissman | ............. | G01S 13/751 |
| 2019/0182793 A1* | 6/2019 | Wang | ..................... | G01S 5/0215 |
| 2019/0239237 A1* | 8/2019 | Stuhaug | ............... | B65G 1/0464 |

* cited by examiner

*Primary Examiner* — Ernest G Tacsik
(74) *Attorney, Agent, or Firm* — File-EE-Patents.com; Jay A. Chesavage

(57) ABSTRACT

The present invention relates to a method and system of locating a wireless device using received signal strengths. The method comprising: determining a plurality of multiple sets of transmit beamforming weights corresponding to a plurality of access points (APs) associated with a plurality of time slots; transmitting a signal using said each of said plurality of multiple sets of transmit beamforming weights associated with said plurality of time slots by said each access point (AP) of said plurality of access points (APs); and generating a plurality of received signal strengths corresponding to said plurality of time slots associated with said each of said plurality of multiple sets of transmit beamforming weights by said each access point (AP) of said plurality of access points (APs) at any location.

25 Claims, 9 Drawing Sheets

METHOD AND SYSTEM OF LOCATING A WIRELESS DEVICE USING RECEIVED SIGNAL STRENGTHS

FIELD OF THE INVENTION

The present invention relates generally to the field of locating a wireless device. In particular, the invention relates to a method and system of locating a wireless device using received signal strengths.

BACKGROUND OF THE INVENTION

Real time location systems (RTLS) have found widespread use. Many such systems utilize Received Signal Strength Indication (RSSI) to locate a wireless device or a wireless station (known as a "tag"). Generally, multiple Access Points (APs) are used for locating a station or a tag by using received signal strength indication (RSSI). For purposes of data connectivity, only one access point (AP) is needed, but for the purpose of locating the tag, more access points (APs) are required. For higher accuracy the number of APs need to be increased. The APs need to be also connected after installing additional power and network cables. The cost of the RTLS system therefore increases. There are systems where instead of using high cost APs, simpler devices are used that help provide location information, but not other functions provided by the APs. These simpler devices involve deployment and wiring cost as well. Hence, there is a need to reduce the cost of an RTLS system, and it is also desired to increase positional accuracy.

In order to overcome the problems of the existing technology as stated above, the present inventor has developed a method and system of locating a wireless device using received signal strengths.

OBJECTS OF THE INVENTION

A first object of the invention is to provide a method of generating a plurality of received signal strengths at any given location.

A second object of the invention is to provide a system of generating a plurality of received signal strengths at any given location.

A third object of the invention is to provide a method of generating a plurality of received signal strengths at any given location, where each physical AP is made to appear as multiple virtual APs.

A fourth object of the invention is to provide a system of generating a plurality of received signal strengths at any given location, where each physical AP is made to appear as multiple virtual APs.

A fifth object of the invention is to provide a method for locating a tag.

A sixth object of the invention is to provide a system for locating a tag.

SUMMARY OF THE INVENTION

A plurality of access points APs are distributed over a coordinate space (x,y) within which a single antenna receiving station (STA) is desired to discern the STA own (x,y) coordinate location by acquiring beacon frame signals from plurality of individual APs. The individual APs operate asynchronously to each other, or transmit a beacon frame at different timeslots to prevent collisions with the other AP beacon frames, and the STA may or may not be associated with one or more APs according to the protocol of IEEE Standard 802.11. Each AP has two or more antennas with phasing and amplitude of a transmit signal modified by a W transmit matrix prior to transmission, such that each AP is capable of using the W transmit matrix to perform either beam steering or provide a phase and amplitude radiation pattern from each AP over the x,y coordinate space as received by the STA. The W transmit matrix is known in the art for improving signal strength to a particular station by beamforming to maximize the RSSI at the station. However, in the present invention, each access point AP transmits using the W matrix in a canonical series of k W transmit matrix modified beacons during a unique beacon frame timeslot which is distinct from the beacon frame timeslot of the other APs. In this manner, the STA receives, at different times, beacon frames from each AP transmitting a canonical beam steering or phasing sequence by modification of its W matrix to create unique spatial amplitude and phase in the x,y coordinate space, which the STA uses to estimate its own (x,y) location. In various examples of the invention, each AP transmits a unique repeating pattern of k beacon frames where the W matrix for the particular AP is varied in either a random, or deterministic manner, such that the radiation pattern formed by each AP during each beacon frame it transmits forms a radiation pattern, or fingerprint, over the (x,y) space the STA occupies. The STA collects an RSSI value from each AP beacon frame transmission subject to:

Each AP generating a beacon frame having k unique W transmit beamforming matrices which repeat in a sequence known to the STA and which modify the radiation pattern of the AP;

Each AP transmits during a unique beacon frame timeslot, such that AP1 through APn transmit at their respective beacon frame timeslots, alternatively each AP transmits such that the STA is able to determine which AP is responsible for a particular beacon frame for the purposes of forming an RSSI fingerprint from each AP transmission.

During beacon frame transmission, each AP is transmitting symbols beamformed by the W matrix, having a sequence of k W transmit beamforming values.

The STA thereby receives k different beamformed AP transmissions over a canonical sequence from each of the n APs, and as the W matrix is a repeatable series of W matrices modifying the radiation pattern, which results in each (x,y) spatial location having a fingerprint (the fingerprint being a unique n*k matrix of RSSI values, comprising k values for each of the n APs), where the (x,y) fingerprint is the combination of k*m subcarrier signal strengths for each of the n APs, mapped over the (x,y) space.

In one example of the invention, the fingerprint of each location is determined by field measurement of RSSI over k*n RSSI values for each possible (x,y) location. In another example of the invention, a model for signal attenuation from each AP is known a-priori, and the STA uses an attenuation and phase model for estimating its (x,y) location from the attenuation and phase of each of the k*n RSSI values over (x,y) of the range covered by the APs.

According to first aspect of the invention, there is provided a method for generating a plurality of received signal strengths, said method comprising: determining a plurality of multiple sets of transmit beamforming weights corresponding to a plurality of APs associated with a plurality of timeslot; wherein each of said plurality of multiple sets of transmit beamforming weights corresponds to each AP of said plurality of APs; wherein said plurality of timeslots is associated with said each AP of said plurality of APs; wherein said each of said plurality of multiple sets of transmit beamforming weights is associated with said plurality of timeslots corresponding to said each AP; wherein each of multiple sets of beamforming weights of said plurality of multiple sets of transmit beamforming weights is associated with each time slot of said plurality of timeslots corresponding to said each AP of said plurality of APs; transmitting a signal using said each of said plurality of multiple sets of transmit beamforming weights associated with said plurality of timeslots by said each AP of said plurality of APs; and generating a plurality of received signal strengths corresponding to said plurality of timeslots associated with said each of said plurality of multiple sets of transmit beamforming weights by said each AP of said plurality of APs at any location.

With reference to the first aspect, in a first possible implementation manner of the first aspect, a set of transmit beamforming weights are independent identically distributed random coefficients.

With reference to the first aspect, in a second possible implementation manner of the first aspect, said each beacon frame interval is 500 milliseconds (ms).

With reference to the first aspect, in a third possible implementation manner of the first aspect, said AP comprises at least two antennas.

With reference to the first aspect, in a fourth possible implementation manner of the first aspect, said each AP is operative to communicate with at least one of said plurality of APs.

According to second aspect of the invention, there is provided a method for generating a plurality of received signal strengths, said method comprising: transmitting a plurality of sets of beacons by an AP; providing a service set identifier (SSID) for each set of beacons and determining a set of transmit beamforming weights for each set of beacons of said plurality of sets of beacons transmitted by said AP; wherein each beacon of said set of beacons is adapted to provide said service set identifier (SSID) and said each beacon of said set of beacons is adapted to be transmitted using said set of transmit beamforming weights; transmitting periodically said each beacon of said set of beacons by said AP; and generating a plurality of received signal strengths corresponding to a plurality of sets of beacons by said AP at any location.

With reference to the second aspect, in a first possible implementation manner of the second aspect, said set of transmit beamforming weights are independent identically distributed random coefficients.

With reference to the second aspect, in a second possible implementation manner of the second aspect, said AP comprises at least two antennas.

According to third aspect of the invention, there is provided a method for locating a tag, said method comprising: determining a plurality of multiple sets of transmit beamforming weights corresponding to a plurality of APs associated with a plurality of timeslots; wherein each of said plurality of multiple sets of transmit beamforming weights corresponds to each AP of said plurality of APs; wherein said plurality of timeslots is associated with said each AP of said plurality of APs; wherein said each of said plurality of multiple sets of transmit beamforming weights is associated with said plurality of timeslots corresponding to said each AP; wherein each of multiple sets of transmit beamforming weights of said plurality of multiple sets of transmit beamforming weights is associated with each time slot of said plurality of timeslots corresponding to said each AP of said plurality of APs; transmitting a signal using said each of said plurality of multiple sets of transmit beamforming weights associated with said plurality of timeslots by said each AP of said plurality of APs; obtaining a plurality of fingerprints corresponding to said plurality of timeslots associated with said each of said plurality of multiple sets of transmit beamforming weights by said each AP of said plurality of APs; measuring a plurality of received signal strength indications (RSSIs) corresponding to said plurality of timeslots associated with said each of said plurality of multiple sets of transmit beamforming weights corresponding to said each AP of said plurality of APs by said tag; and determining a location of said tag using said plurality of fingerprints and said plurality of RSSIs.

With reference to the third aspect, in a first possible implementation manner of the third aspect, a set of transmit beamforming weights are independent identically distributed random coefficients.

With reference to the third aspect, in a second possible implementation manner of the third aspect, each beacon frame interval is 500 milliseconds (ms).

With reference to the third aspect, in a third possible implementation manner of the third aspect, said AP comprises at least two antennas.

With reference to the third aspect, in a fourth possible implementation manner of the third aspect, said each AP is operative to communicate with at least one of said plurality n of APs.

According to fourth aspect of the invention, there is provided a system for generating a plurality of received signal strengths, said system comprising: a plurality of APs, wherein each AP is adapted to associate with a multiple sets of transmit beamforming weights corresponding to a plurality of timeslots; said each AP adapted to transmit a signal using said multiple sets of transmit beamforming weights associated with said plurality of timeslots; and said each AP adapted to generate a plurality of received signal strengths corresponding to said multiple sets of transmit beamforming weights associated with said plurality of timeslots at any location.

With reference to the fourth aspect, in a first possible implementation manner of the fourth aspect, each of multiple sets of transmit beamforming weights is a set of transmit beamforming weights.

With reference to the fourth aspect, in a second possible implementation manner of the fourth aspect, said set of transmit beamforming weights are independent identically distributed random coefficients.

With reference to the fourth aspect, in a third possible implementation manner of the fourth aspect, said set of transmit beamforming weights are associated with a time slot of said plurality of timeslots corresponding to said each AP of said plurality of APs.

With reference to the fourth aspect, in a fourth possible implementation manner of the fourth aspect, said time slot duration is 500 milliseconds (ms).

With reference to the fourth aspect, in a fifth possible implementation manner of the fourth aspect, said AP comprises at least two antennas.

With reference to the fourth aspect, in a sixth possible implementation manner of the fourth aspect, said each AP is operative to communicate with at least one of said plurality of APs.

According to fifth aspect of the invention, there is provided a system for generating a plurality of received signal strengths, said system comprising: an AP adapted to transmit a plurality of sets of beacons; said AP adapted to provide a service set identifier (SSID) for each set of beacons and said AP adapted to determine a set of transmit beamforming weights for each set of beacons of said plurality of sets of beacons; wherein each beacon of said set of beacons is adapted to provide said service set identifier (SSID) and said each beacon of said set of beacons is adapted to be transmitted using said set of transmit beamforming weights; said AP adapted to periodically transmit said each beacon of said set of beacons; and said AP adapted to generate a plurality of received signal strengths corresponding to a plurality of sets of beacons at any location.

With reference to the fifth aspect, in a first possible implementation manner of the fifth aspect, said set of transmit beamforming weights are independent identically distributed random coefficients.

With reference to the fifth aspect, in a second possible implementation manner of the fifth aspect, said AP comprises at least two antennas.

According to sixth aspect of the invention, there is provided a system for locating a tag, said system comprising: a plurality of APs, wherein each AP is adapted to associate with a multiple sets of transmit beamforming weights corresponding to a plurality of timeslots; said each AP adapted to transmit a signal using said multiple sets of transmit beamforming weights associated with said plurality of timeslots; and said each AP adapted to generate a plurality of fingerprints corresponding to said plurality of timeslots associated with said multiple sets of transmit beamforming weights; said tag adapted to measure a plurality of RSSIs corresponding to said multiple sets of transmit beamforming weights associated with said plurality of timeslots corresponding to said each AP; and a location engine configured to determine a location of said tag using said plurality of fingerprints and said plurality of RSSIs.

With reference to the sixth aspect, in a first possible implementation manner of the sixth aspect, each of multiple sets of transmit beamforming weights is a set of transmit beamforming weights.

With reference to the sixth aspect, in a second possible implementation manner of the sixth aspect, said set of transmit beamforming weights are independent identically distributed random coefficients.

With reference to the sixth aspect, in a third possible implementation manner of the sixth aspect, said set of transmit beamforming weights are associated with a time slot of said plurality of timeslots corresponding to said each AP of said plurality of APs.

With reference to the sixth aspect, in a fourth possible implementation manner of the sixth aspect, said time slot duration is 500 milliseconds (ms).

With reference to the sixth aspect, in a fifth possible implementation manner of the sixth aspect, said AP comprises at least two antennas.

With reference to the sixth aspect, in a sixth possible implementation manner of the sixth aspect, said each AP is operative to communicate with at least one of said plurality of APs.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein.

Figure 1:
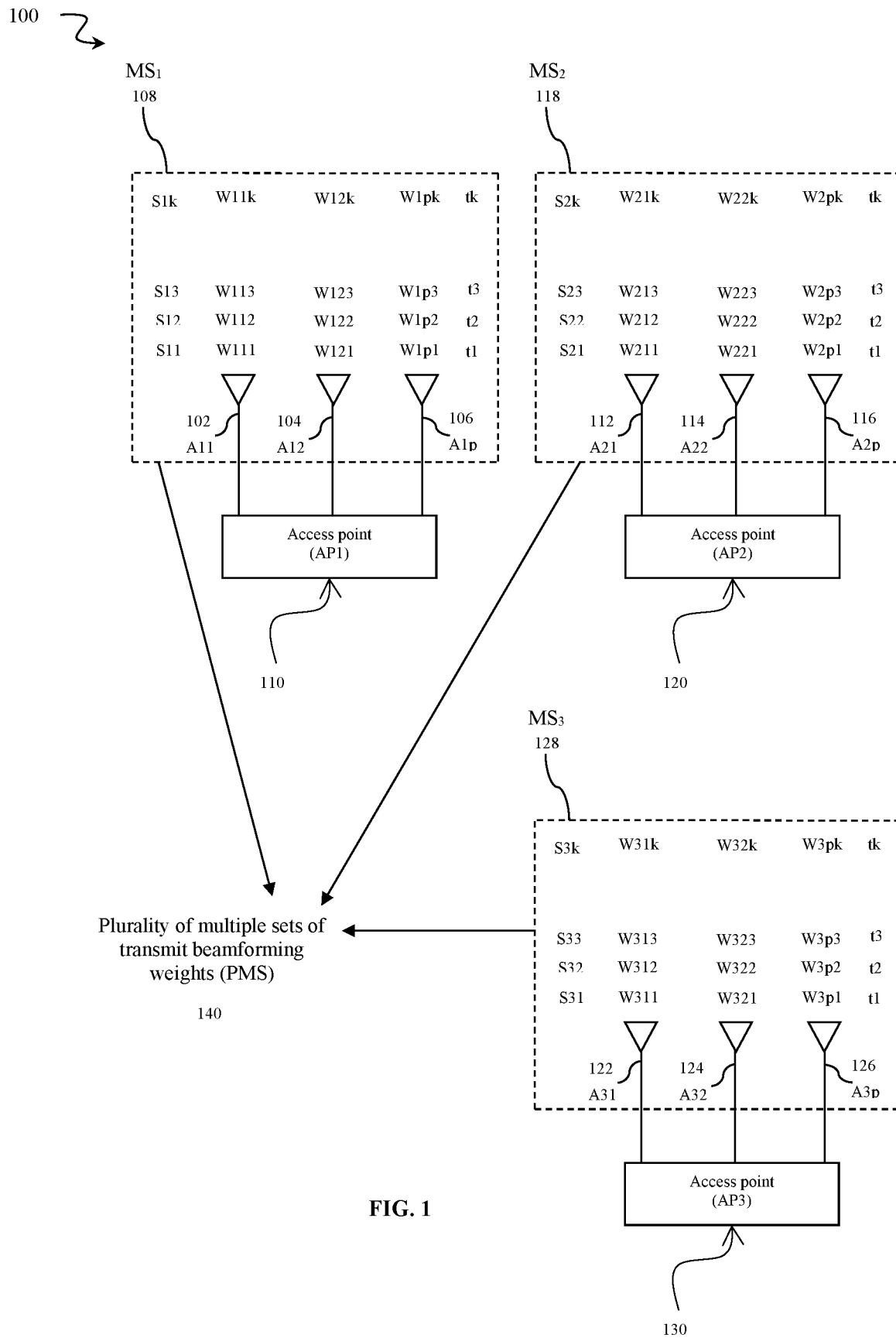
FIG. 1 illustrates a block diagram of an RTLS system of generating plurality of received signal strengths at any given location, in accordance with an embodiment of the present invention.

It should be understood that the drawings are an aid to understanding certain aspects of the present invention and are not to be construed as limiting.

DETAILED DESCRIPTION OF THE INVENTION

While system and method are described herein by way of example and embodiments, those skilled in the art recognize that system and method for locating a wireless device using received signal strengths are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

Disclosed embodiments provide a method and system of locating a wireless device using received signal strengths.

Figure 7:
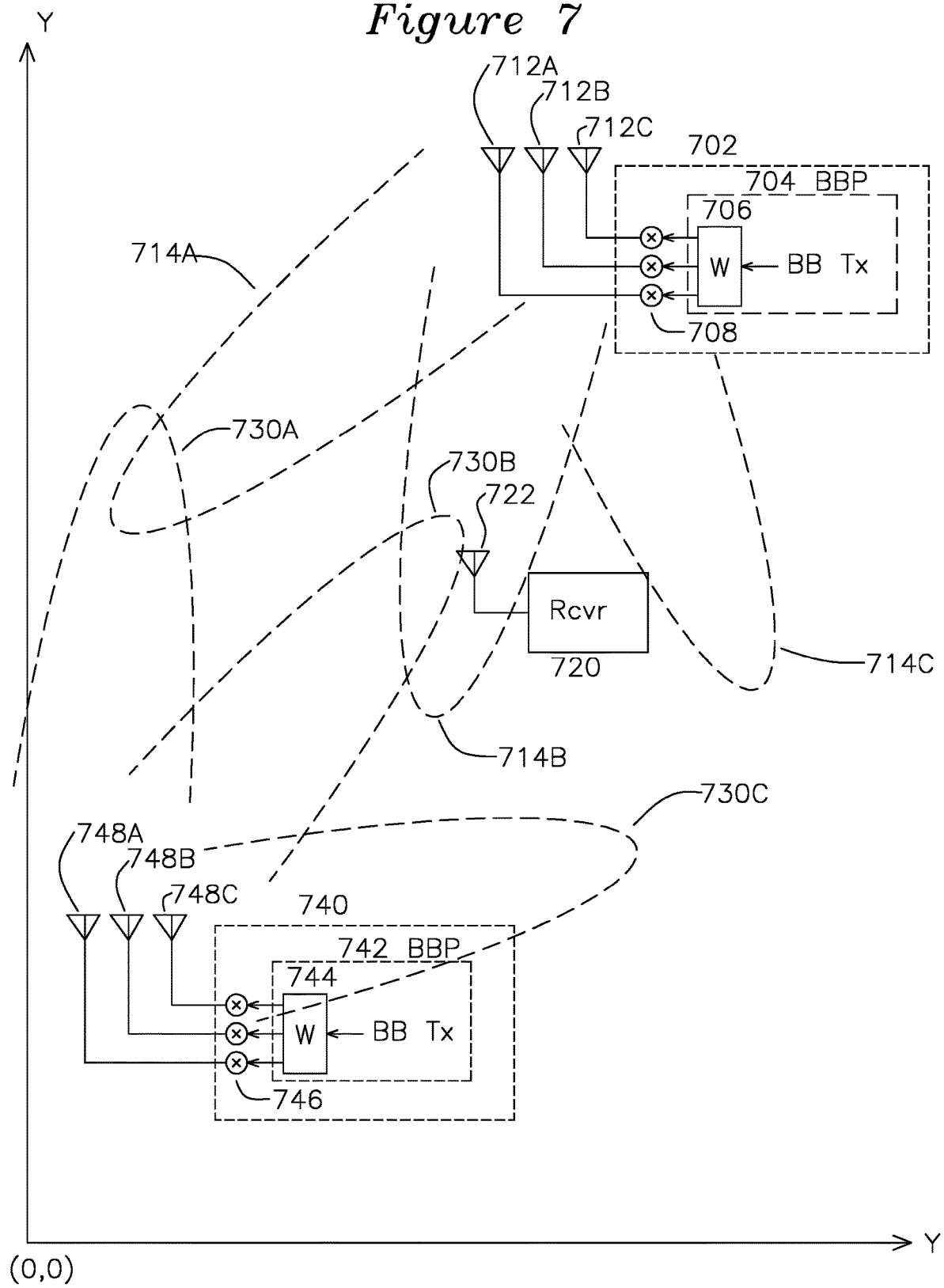
FIGS. 7 and 8 are composite plan views of two or more APs transmitting signals beamformed by a W matrix in an x,y coordinate space, where the (x,y) position of a station STA is estimated from measured or estimated RSSI(x,y).

FIG. 7 shows an example arrangement of APs 702 and 740 which are transmitting using a W transmit matrix which varies over time and over k beamforming values for each AP. In one example for understanding the invention, the W matrix may contain incrementing phase delays and unity gain which causes the resultant beam pattern of the antennas 712A, 712B, and 712C to form a directional radiation pattern with a maximum power lobe, which for each successive beacon frame results in the maximum radiation pattern sweeping circularly about the center of the three antennas, such that a first beacon produces a maximum radiation pattern directed as 714A, a second beacon produces a maximum radiation pattern 714B directed to receiver 720, and a successive third beacon produces a maximum radiation pattern 714C (the symmetric reverse beampattern not shown). These particular beam patterns are shown for illustration only, the beam patterns may be optimized for directional power, or some other pattern which results in a unique radiation profile over the radiation extent (x,y), and each AP may have p antennas, not necessarily the same number for each AP. Beacon transmitter 702 has a baseband transmit processor for forming beacon frames, which is coupled to a transmit W matrix of the form [W1 W2 W3] where each coefficient W1, W2, W3 may be of the form (a+bj), or $Ae^{j\varphi}$, thereby having the property of changing the relative phase of each transmitter element emission, resulting in either a beam steering of the maximum radiation pattern (as shown in FIG. 7), or a particular distribution in (x,y) of the radiation pattern in a manner which may be directly measured for characterization, or estimated from a propagation model of the antennas of the AP such as 702 or 740. The number of antennas is shown as 3, but is generally p antennas, each with a corresponding W matrix for a particular k instance of transmission where a sequential or canonical sequence of k transmit matrices W are in use. Access points 702 and 740 have respective baseband processor 704 and 742, respectively, which also perform beamforming using the transmit W matrix 706 and 744, respectively, thereafter to mixers 708 and 746, respectively, and to antennas 712A/712B/712C and 748A/748B/748C, respectively. Other components (local oscillator, digital to analog converters, and filters) are not shown for clarity in understanding the principles of the invention, but are ordinarily present, as is known to one skilled in the art of wireless communication signal processing. The (x,y) position of the station 720 can thereby be estimated based on received power (RSSI) from each AP 702 and 720. Once either characterized, or by knowledge of the (x,y) location of each AP 702, 740 combined with a propagation model and the canonical W transmission sequence, receiver 720 may be placed in the (x,y) coordinate space of the APs and thereby accurately estimate its position in the (x,y) coordinate space based on the received signal strength indicator (RSSI) measured over the canonical sequence of k transmission events (each with its own W coefficients at the rate of one RSSI per beacon frame), since the station 720 has only a single omnidirectional antenna. In a simple embodiment of the present example, AP 702 generates beacon frames by advancing the phase component of its transmit W matrix to achieve beam steering, resulting in the exemplar sequential beam pattern sequence 714A, 714B, 714C, and, at non-interfering times to AP 702, AP 740 generates beacon frames using a W transmit matrix sequence of k length which results in maximum beam patterns 730A, 730B, and 730C. Station 720 may observe a maximum power for beacon 714B from AP 720, and a maximum power for beacon 730B from AP 720.

Figure 8:
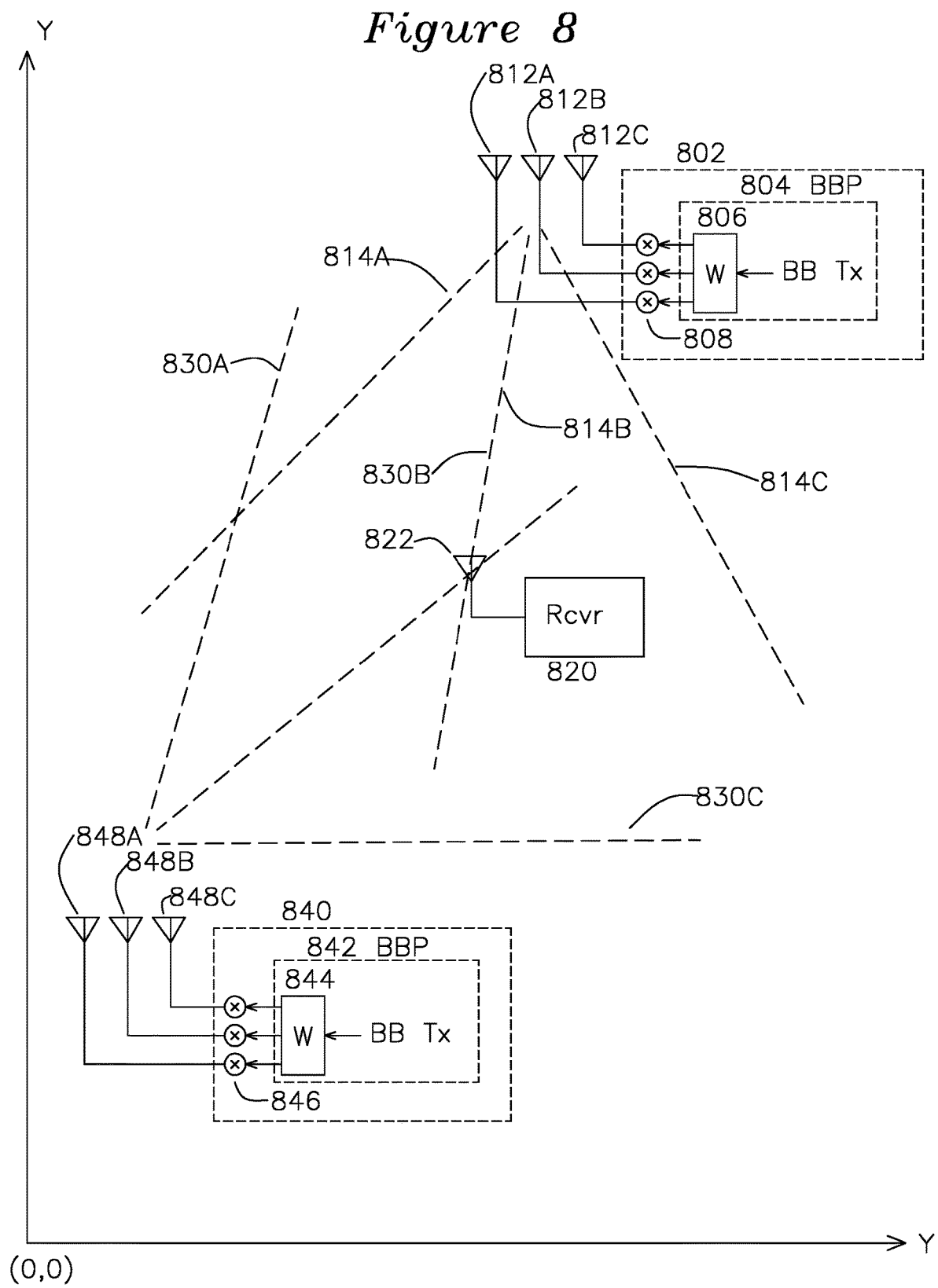

FIG. 8 shows an analogous system where AP 802 and AP 840 operate as before, with elements 7xx replaced by 8xx, except that the W matrix 806 of AP 802 and W matrix 844 of AP 840 is not a coordinated beam steering, but a pseudo-random phase sequence with unity amplitude, such as a particular W transmit coefficient is of the form $1*e^{j\varphi}$ where $\varphi$ is a canonical pseudo-random number sequence of k length (each coefficient with unity amplitude), or $\varphi$ is an incrementing phase value, or $\varphi$ is coordinated across W1, W2, W3 . . . Wk to produce the steered beam pattern described in FIG. 7. Where the beam pattern is not steered across the antennas during transmit, a complex radiation pattern profile is formed for each beacon transmit event by each AP 802 and 840. By knowledge of the radiation beam pattern produced by each AP 802 and 840, either by characterization of the (x,y) coordinate space, or by use of a predictive radiation pattern model, the AP 820 may compare the local radiation pattern produced for each successive beacon frame and by each separate AP, to determine its (x,y) location. The process of discerning (x,y) location from RSSI is referred to as "fingerprinting". The (x,y) location of the tag 720 or 820 may be expressed as GPS coordinates, or as (x,y) coordinates relative to the position of APs 702, 740 or 820,840, respectively.

Figure 9:
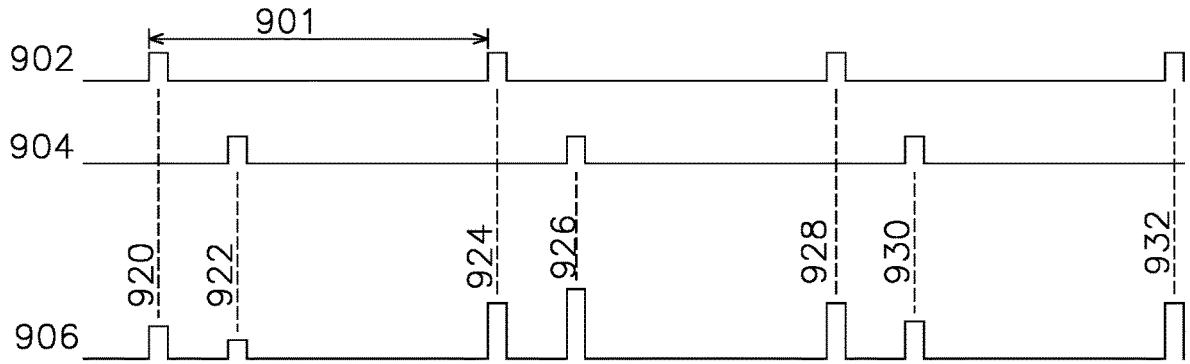
FIG. 9 is a timing diagram for FIG. 7 for the case of two APs transmitting to the STA.

FIG. 9 shows a timing diagram for the beacon frames of the AP, where the elevated regions of waveform 902 at times 920, 922, etc. indicate a beacon frame transmission by a first AP such as 702 or 802, and waveform 904 indicates a beacon frame transmission by a second AP such as 740 or 840 of FIGS. 7 and 8, respectively. Each successive transmission at times 920, 924, 928, 932 by the first AP, and each successive transmission at times 922, 926, 930 by the second AP utilize a W transmit matrix with W coefficients which are varied from beacon frame to beacon frame such as the beacon frame to beacon frame interval 901, preferably in a canonical manner which repeats or is otherwise identifiable by the receiving station after k beacon frames, each W transmit matrix having coefficients of dimension p equal to the number of antennas being controlled.

Figure 10:
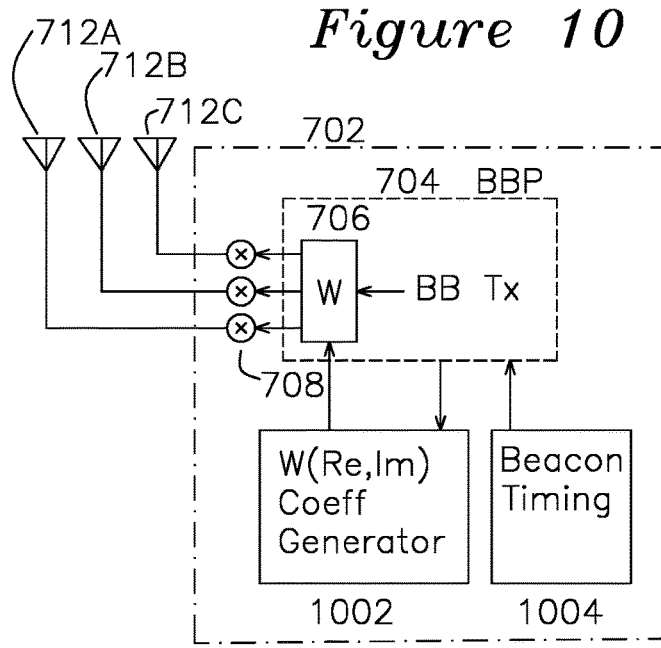
FIG. 10 is a block diagram of an APs beacon frame transmitter.

FIG. 10 shows additional detail for the transmitter of FIG. 7 (or 8), where the W transmit beamforming matrix receives updated coefficients from coefficient generator 1002 for each successive beacon frame. Beacon timing 1004 estimates the beacon frame timeslot for each beacon frame, as well as indicates to the baseband processor 704 and particular W coefficient generator 1002 the transmit beamformer will use for each successive beacon frame over the series of k such repeating frames, each with a particular W coefficient matrix.

Figure 11:
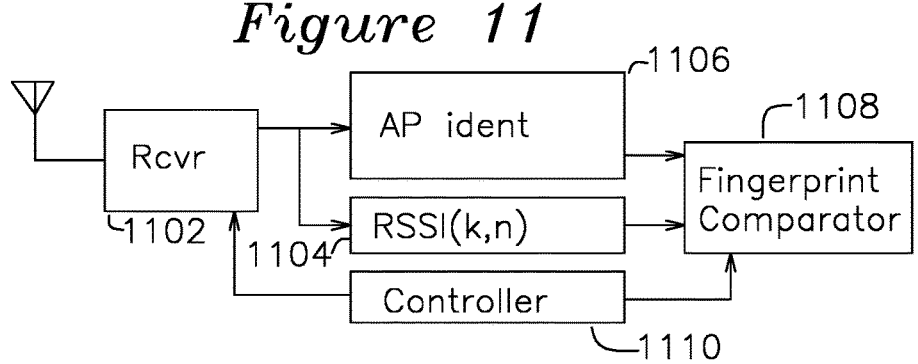
FIG. 11 is a block diagram of a location resolver operative to determine an (x,y) location from AP transmissions reported by a STA.

FIG. 11 shows a detailed view of a location resolver receiving RSSI measurements such as from station 720 or 820. The location resolver function can be part of an AP or any other host which receives RSSI measurements from an STA and has information such as the radiation pattern of each AP (such as by association of RSSI fingerprint with each W matrix for each AP), or a radiation model for each AP such that it can take the RSSI measurements and correlate to an (x,y) location for the STA based on the RSSI measurements it reports. Receiver 1102 receives from a STA the RSSI associated with a previously received beacon, which RSSI value is stored in RSSI memory 1104, which separately saves RSSI values measured by the station for each of the k canonical beacon frames and n APs (n=2 in the present examples, but increased accuracy is available with greater number of APs). AP identifier 1106 associates the RSSI measurements from each beacon frame with a particular AP and associated W sequence (for the k different W values of the sequence). Fingerprint comparator 1108 is operative to compare the RSSI values over k sequences and n APs to resolve the (x,y) location of the tag 720 or 820 from the RSSI values and known location of at least one AP.

FIG. 1 illustrates a block diagram of an RTLS system 100 for generating a plurality of received signal strengths at any given location, in accordance with an embodiment of the present invention.

In an embodiment, the system 100 comprises a plurality n of APs, wherein each AP has at least two antennas and has as many as p antennas. As shown in FIG. 1, the system comprises n=3 APs namely AP1 110, AP2 120 and AP3 130. The number of APs is not limited to three APs as shown in the figure. It is shown only for explanation purpose. Each AP AP1 110, AP2 120 and AP3 130 has a plurality p of antennas. The AP AP1 110 has antennas namely A11 102, A12 104, . . . A1p 106, the AP AP2 120 has antennas namely A21 112, A22 114, . . . A2p 116, and the AP AP3 130 has antennas namely A31 122, A32 124, . . . A3p 126 as shown in FIG. 1. A set of transmit beamforming weights W is applied to the set of antennas of an AP during a particular beacon frame. Multiple sets of transmit beamforming weights W are applied across a plurality of k beacon frames in respective beacon frame timeslots by an AP. A plurality of multiple sets of transmit beamforming weights are applied across a plurality of k timeslots by a plurality n of APs, each AP having p antennas.

As shown in FIG. 1, in an embodiment, each of a plurality of multiple (k) sets of transmit beamforming weights namely MS1 108 of an (AP1) 110 comprises multiple sets of transmit beamforming weights namely S11, S12, S13, . . . S1k across a plurality of timeslots namely t1, t2, t3, . . . tk. The set of transmit beamforming weights namely S11 comprises transmit beamforming weights namely W111, W121, . . . W1p1 (one for each participating transmit antenna) and is applied on the antennas of an, AP1 110 during a time slot t1. Similarly, another set of transmit beamforming weights namely S12 comprises transmit beamforming weights namely W112, W122, . . . W1p2 and is applied on the antennas of an AP, AP1 110, during a time slot t2. Similarly, another set of transmit beamforming weights namely S13 comprises transmit beamforming weights namely W113, W123, . . . W1p3 and is applied on each of the p antennas of an AP, AP1 110, during a time slot t3. This sequence continues until the final set of transmit beamforming weights namely S1k comprises transmit beamforming weights namely W11k, W12k, . . . W1pk and is applied on the p antennas of an AP, AP1 110, during the last time slot tk of a canonical sequence. The multiple set of transmit beamforming weights namely MS1 108 comprises multiple sets of transmit beamforming weights namely S11, S12, S13, . . . S1k, which are applied across a plurality k of timeslots namely t1, t2, t3, . . . tk by an AP AP1 110.

In an embodiment, each of a plurality of multiple sets of transmit beamforming weights namely MS2 118 of an AP AP2 120 comprises multiple sets of transmit beamforming weights namely S21, S22, S23, . . . S2k across a plurality of timeslots namely t1, t2, t3, . . . tk. The set of transmit beamforming weights namely S21 comprises transmit beamforming weights namely W211, W221, . . . W2p1 and is applied on the p antennas of an AP, AP2 120, during a time slot t1. Similarly, another set of transmit beamforming weights namely S22 comprises transmit beamforming weights namely W212, W222, . . . W2p2 and is applied on the antennas of an AP, AP2 120, during a time slot t2. Similarly, another set of transmit beamforming weights namely S13 comprises transmit beamforming weights namely W213, W223, . . . W2p3 and is applied on the antennas of an AP, AP2 120, during a time slot t3. In this manner, the final set of transmit beamforming weights namely S2p comprises transmit beamforming weights namely W21k, W22k, . . . W2pk is applied on the antennas of an AP, AP2 120, during a time slot tk. The symbol MS2 118 denotes multiple sets of transmit beamforming weights, namely S21, S22, S23, . . . S2k, which are applied across a plurality of timeslots namely t1, t2, t3, . . . tk by an AP AP2 120.

In this manner, the multiple sets of transmit beamforming weights are applied across a plurality of timeslots namely t1, t2, t3, . . . tk by an AP.

As shown in the FIG. 1, in an embodiment, a plurality of multiple sets of transmit beamforming weights namely (PMS) 140 comprises multiple sets of transmit beamforming weights namely MS1 108, MS2 118, MS3 128, . . . MSn corresponding to plurality of APs AP1 110, AP2 120, AP3 130, . . . APn. The plurality of multiple sets of transmit beamforming weights namely (PMS) 140 are applied across plurality of timeslots namely t1, t2, t3, . . . tk by plurality of APs AP1 110, AP2 120, AP3 130, . . . APn. In other words, the sets of transmit beamforming weights namely S11, S21, S31, . . . Sk1 are applied during a time slot t1 by the APs AP1 110, AP2 120, AP3 130, . . . APn respectively; the sets of transmit beamforming weights namely S12, S22, S32, . . . Sn2 are applied during a time slot t2 by the APs AP1 110, AP2 120, AP3 130, . . . APk respectively; the sets of transmit beamforming weights namely S13, S23, S33, . . . Sn3 are applied during a time slot t3 by the APs AP1 110, AP2 120, AP3 130, . . . APn respectively; similarly, the sets of transmit beamforming weights namely S1k, S2k, S3k, . . . Spk are applied during a final canonical beacon frame timeslot tk by the APs AP1 110, AP2 120, AP3 130, . . . APn respectively. In this manner, the plurality of multiple sets of transmit beamforming weights are applied across plurality of timeslots t1, t2, t3, . . . tk by the plurality of APs. In other words, during a time slot, multiple APs transmit signals using a sequential set of transmit beamforming weights applied one after the other. There is a time gap between the signals transmitted by the APs. For example, during a time slot t1, the APs AP1 110, AP2 120, AP3 130, . . . APk transmit signals using set of beamforming weights namely S11, S21, S31, . . . Sk1 one after the other. In an embodiment, the time gap between the transmissions of the APs is 10 microseconds.

In an embodiment, the system is for generating a plurality of received signal strengths for use by a station receiver. The system comprises a plurality of APs, wherein each AP is adapted to transmit using a multiple sets of transmit beamforming weights corresponding to a plurality of timeslots. The AP comprises at least two antennas. In an embodiment, the set of transmit beamforming weights are independent identically distributed complex Gaussian random coefficients. In an embodiment, the weights are of magnitude 1 and phase is a random variable that is uniformly distributed from −pi to pi radians. In an embodiment, the transmit beamforming weights are as shown in the table 1.

TABLE 1

| S. No. | Time Slot | Access Point 1 (AP1) | Access Point 2 (AP2) | Access Point 3 (AP3) |
|---|---|---|---|---|
| 1 | t1 | (W111, W121) = (−0.3059 + 0.2082i, −1.1777 − 0.9448i) | (W211, W221) = (0.0886 + 0.5051i, 0.2034 + 1.1480i) | (W311, W321) = (−0.8107 − 0.4892i, 0.8421 + 0.6067i) |
| 2 | t2 | (W112, W122) = (0.8409 + 0.8867i, −0.0266 − 1.1269i) | (W212, W222) = (0.2314 − 1.0189i, 0.1235 + 0.4039i) | (W312, W322) = (−0.1320 − 0.2828i, 0.5132 + 0.4879i) |
| 3 | t3 | (W113, W123) = (−0.4160 + 0.5767i, 1.5437 + 0.5034i) | (W213, W223) = (−0.0964 + 0.9123i, 0.0806 + 0.4728i) | (W313, W323) = (0.7543 + 0.8420i, 0.0419 − 0.8503i) |

As shown in the table 1, the transmit beamforming weights namely W111, W121 (equivalent to −0.3059+0.2082i, −1.1777 −0.9448i), W211, W221 (equivalent to 0.0886+0.5051i, 0.2034+1.1480i), and W311, W321 (equivalent to −0.8107−0.4892i, 0.8421+0.6067i) are applied during a time slot t1 by the APs AP1 110, AP2 120, and AP3 130 respectively; the transmit beamforming weights namely W112, W122, (equivalent to 0.8409+0.8867i, −0.0266 −1.1269i), W212, W222 (equivalent to 0.2314−1.0189i, 0.1235+0.4039i), and W312, W322 (equivalent to −0.1320 −0.2828i, 0.5132+0.4879i) are applied during a time slot t2 by the APs AP1 110, AP2 120, and AP3 130 respectively; the transmit beamforming weights namely W113, W123 (equivalent to −0.4160+ 0.5767i, 1.5437+0.5034i), W213, W223 (equivalent to −0.0964+0.9123i, 0.0806+0.4728i), and W313, W323 (equivalent to 0.7543+0.8420i, 0.0419 −0.8503i) are applied during a time slot t3 by the APs AP1 110, AP2 120, and AP3 130 respectively.

In another embodiment, the transmit normalized beamforming weights are as shown in table 2.

TABLE 2

| S. No. | Time Slot | Access Point 1 (AP1) | Access Point 2 (AP2) | Access Point 3 (AP3) |
|---|---|---|---|---|
| 1 | t1 | (W111, W121) = (−0.3956 + 0.9184i, −0.8299 + 0.5580i) | (W211, W221) = (−0.6982 − 0.7159i, −0.8555 + 0.5178i) | (W311, W321) = (0.6737 + 0.7390i, −0.8180 − 0.5752i) |
| 2 | t2 | (W112, W122) = (0.1781 − 0.9840i, 0.9569 + 0.2903i) | (W212, W222) = (−0.9646 + 0.2638i, −0.9758 + 0.2188i) | (W312, W322) = (−0.5484 − 0.8362i, −0.9830 + 0.1837i) |
| 3 | t3 | (W113, W123) = (−0.9640 + 0.2659i, 0.9958 − 0.0918i) | (W213, W223) = (−0.3107 + 0.9505i, −0.6282 − 0.7780i) | (W313, W323) = (0.8816 − 0.4720i, −0.8631 + 0.5051i) |

As shown in the table 2, the transmit normalized beamforming weights namely W111, W121 (equivalent to −0.3956+0.9184i, −0.8299+0.5580i), W211, W221 (equivalent to −0.6982 −0.7159i, −0.8555+0.5178i), and W311, W321 (equivalent to 0.6737+0.7390i, −0.8180-0.5752i) are applied during a time slot t1 by the APs AP1 110, AP2 120, and AP3 130 respectively; the transmit normalized beamforming weights namely W112, W122, (equivalent to 0.1781−0.9840i, 0.9569+0.2903i), W212, W222 (equivalent to −0.9646+0.2638i, −0.9758+0.2188i), and W312, W322 (equivalent to −0.5484−0.8362i, −0.9830+0.1837i) are applied during a time slot t2 by the APs AP1 110, AP2 120, and AP3 130 respectively; the transmit normalized beamforming weights namely W113, W123 (equivalent to −0.9640+0.2659i, 0.9958−0.0918i), W213, W223 (equivalent to −0.3107+0.9505i, −0.6282−0.7780i), and W313, W323 (equivalent to 0.8816−0.4720i, −0.8631+0.5051i) are applied during a time slot t3 by the APs AP1 110, AP2 120, and AP3 130 respectively.

In yet another embodiment, where there are n=3 APs and the number of transmit antennas at each AP is 2, the transmit beamforming weights are chosen as [0.7071, 0.7071], [−0.7071, 0.7071] across 2 timeslots and are the same across all APs. In another embodiment, the transmit beamforming weights are chosen as [1, 0], [0, 1] across the 2 timeslots.

Figure 2:
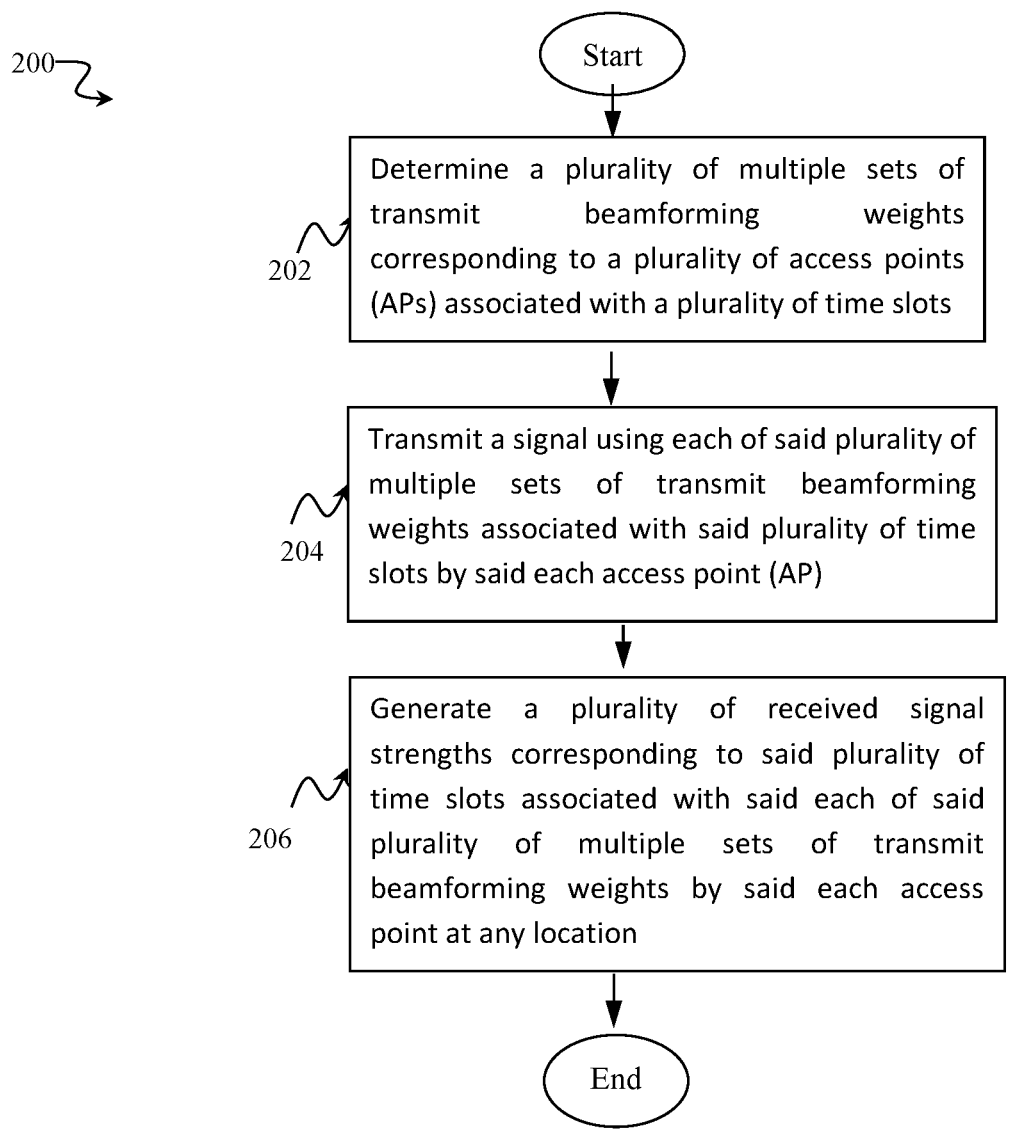
FIG. 2 illustrates a flowchart of a method of generating plurality of received signal strengths at any given location, in accordance with an embodiment of the present invention.

Each AP is adapted to transmit a signal using said multiple sets of transmit beamforming weights associated with said plurality of timeslots. In an embodiment, each time slot duration is 500 milliseconds (ms). Each AP is adapted to generate a plurality of received signal strengths corresponding to said multiple sets of transmit beamforming weights associated with said plurality of timeslots at any location.

v FIG. 2 illustrates a flowchart of a method 200 of generating a plurality of received signal strengths at any given location, in accordance with an embodiment of the present invention. At step 202, a plurality of multiple sets of transmit beamforming weights corresponding to a plurality of APs associated with a plurality of timeslots is determined. Each of said plurality of multiple sets of transmit beamforming weights corresponds to each AP of the plurality of APs. The set of transmit beamforming weights are independent identically distributed random coefficients. The weights are of magnitude 1 and phase φ is a random variable that is uniformly distributed from −pi to pi radians. The AP comprises at least two antennas. Each AP is operative to communicate with at least one of said plurality of APs. In this manner the synchronization of timeslots is maintained across the plurality of APs. The plurality of timeslots is associated with said each AP of the plurality of APs. Each of said plurality of multiple sets of transmit beamforming weights is associated with said plurality of timeslots corresponding to said each AP; wherein each of multiple sets of transmit beamforming weights of the plurality of multiple sets of transmit beamforming weights is associated with each time slot of said plurality of timeslots corresponding to said each AP of the plurality of APs. Each time slot duration is 500 milliseconds (ms).

At step 204, a signal using said each of said plurality of multiple sets of transmit beamforming weights associated with said plurality of timeslots by said each AP of the plurality of APs is transmitted. Thereby, at step 206, a plurality of received signal strengths corresponding to said plurality of timeslots associated with said each of said plurality of multiple sets of transmit beamforming weights by said each AP of the plurality of APs at any location is generated.

In various embodiments, due to the scattering present in the environment, the RSSI corresponding to a given AP, seen at any given location is different across different timeslots due to application of different sets of transmit beamforming weights at the transmitter. The manner in which the RSSI varies depends on both the location as well as the environment. Simple randomly distributed transmit beamforming weights can be used. In an embodiment, the W coefficients are complex numbers that have magnitude 1 and phase φ that is uniformly distributed from −pi to pi.

In various embodiments, some of the antennas may not be used at all in which case the weight (coefficient magnitude) corresponding to these antennas is set to 0. The remaining weights are distributed as complex numbers with magnitude 1 and phase that is uniformly distributed from −pi to pi. In various other embodiments, the magnitude of the weights is also uniformly distributed from 0.5 to 1. It must be understood that the magnitude can be scaled by an arbitrary constant (across antennas) factor depending on the transmit power and the digital gain in the transmitter module.

Figure 3:
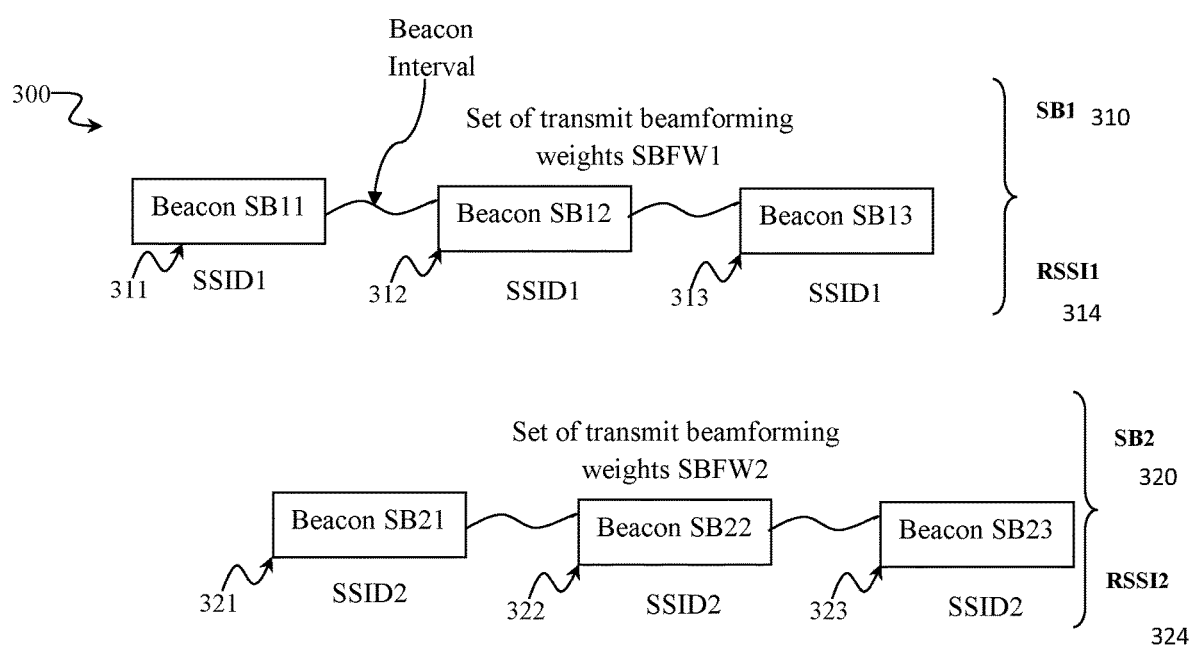
FIG. 3 illustrates a block diagram of an RTLS system of generating plurality of received signal strengths at any given location, where each physical AP is made to appear as multiple virtual APs in accordance with an embodiment of the present invention.

FIG. 3 illustrates a block diagram of an RTLS system 300 for generating a plurality of received signal strengths at any given location, in accordance with an embodiment of the present invention. In this embodiment, a single physical AP is configured to behave as multiple virtual APs.

In an embodiment, the system 300 comprises a plurality of APs, wherein each AP is adapted to transmit a plurality of sets of beacons. In the figure, it is shown that one AP it transmits two sets of beacons namely a first set of beacons (SB1) 310 and a second set of beacons (SB2) 320.

The number of APs and sets of beacons are not limited to one AP and two sets of beacons as shown in the figure. It is shown only for explanation purpose.

The first set of beacons (SB1) 310 has three beacons namely SB11 311, SB12 312, SB13 313 and the second set of beacons (SB2) 320 has three beacons namely SB21 321, SB22 322, SB23 323. The number of beacons per set is not limited to three beacons as shown in the figure. It is shown only for explanation purpose. Due the presence of plurality of beacons, stations perceive the signals from the same physical AP as if they are coming from multiple APs (these are virtual APs).

The first set of beacons (SB1) 310 comprises a service set identifier (SSID1) and the second set of beacons (SB2) 320 comprises a service set identifier (SSID2). In other words, the three beacons namely SB11 311, SB12 312, SB13 313 present in the first set of beacons (SB1) 310 have the same service set identifier (SSID1) and the three beacons namely SB21 321, SB22 322, SB23 323 present in the second set of beacons (SB2) 320 have the same service set identifier (SSID2).

The AP is adapted to determine and apply different sets of transmit beamforming weights for different sets of beacons. As shown in the FIG. 3, the AP applies a set of transmit beamforming weights (SBFW1) for the first set of beacons (SB1) 310 and a set of transmit beamforming weights (SBFW2) for the second set of beacons (SB2) 320. In other words, the three beacons namely SB11 311, SB12 312, SB13 313 present in the first set of beacons (SB1) 310 are applied with the same set of transmit beamforming weights (SBFW1) by the AP and the three beacons namely SB21 321, SB22 322, SB23 323 present in the second set of beacons (SB2) 320 are applied with the same set of transmit beamforming weights (SBFW2) by the AP.

The three beacons namely SB11 311, SB12 312, SB13 313 present in the first set of beacons (SB1) 310 have the same service set identifier (SSID1) and are applied with the same set of transmit beamforming weights (SBFW1) by the AP; and the three beacons namely SB21 321, SB22 322, SB23 323 present in the second set of beacons (SB2) 320 have the same service set identifier (SSID2) and are applied with the same set of transmit beamforming weights (SBFW2) by the AP. To a station receiving these transmissions which needs to determine an (x,y) location, these beacons appear to be transmitted by a different AP (although they are transmitted by the same physical AP) since the SSID is different. So the AP appears to be also as additional virtual AP. The tag would therefore report two RSSIs for the two virtual APs due to the fact that the corresponding same physical AP used different sets of transmit beamforming weights for these two sets of beacons. In this manner, a legacy RTLS system that has APs with multiple antennas can be adapted to effectively appear as a similar legacy RTLS system but with more number APs (the increase in the number of APs arising from virtual APs). Thereby the accuracy of locating the tag improves. The tag simply reports the RSSIs of the virtual APs as being corresponding to different APs. This helps improve accuracy of locating for the same number of physical APs.

The AP is adapted to periodically transmit each beacon. In other words, the AP transmits periodically a beacon, wherein the beacon comprises a service set identifier and the beacon is applied with a set of transmit beamforming weights. For example, a beacon, namely SB11 311, has a service set identifier SSID1 with a set of transmit beamforming weights (SBFW1) and it is periodically transmitted by the AP. For example, a beacon, namely SB21 321, has a same service set identifier SSID2 with a set of transmit beamforming weights (SBFW2) and it is periodically transmitted by the AP.

In this manner, the AP is adapted to generate a plurality of received signal strengths corresponding to a plurality of sets of beacons. In other words, the received signal strengths are obtained/measured/generated corresponding to a set of beacons. As shown in the FIG. 3, the AP generates a received signal strengths (RSSI1) 314 corresponding to a first set of beacons (SB1) 310 and a received signal strengths (RSSI2) 324 corresponding to a first set of beacons (SB2) 320.

In this manner, the station forms a plurality (n*k) of received signal strengths from respective APs namely RSSI1 314, RSSI2 324, RSSI3, . . . RSSIp corresponding to the first set of beacons (SB1) 310 from a first AP, second set of beacons (SB2) 320 from a second AP, third set of beacons (SB3) from a third AP, and finally an . . . nth set of beacons (SBn) from the last (nth) AP wherein the beacons namely SB11 311, SB12 312, SB13 313, . . . SB1p present in the first set of beacons (SB1) 310 have same service set identifier (SSID1) and were transmitted using the same set of transmit beamforming weights (SBFW1) by the AP; and the beacons namely SB21 321, SB22 322, SB23 323, . . . SB2p present in the second set of beacons (SB2) 320 have same service set identifier (SSID2) and were transmitted using the same set of transmit beamforming weights (SBFW2) by the AP; similarly, the beacons namely SBp1, SBp2, SBp3, . . . SBpk present in the first set of beacons (SB1) have same service set identifier (SSID1) and are applied with same set of transmit beamforming weights (SBFWp) by the AP. Due the presence of plurality of beacons with different SSIDs, stations perceive the signals from the same physical AP as if they are coming from multiple APs with different SSIDs (these are virtual APs).

In an embodiment, the system 300 is for generating a plurality of received signal strengths. The system comprises an AP, which is adapted to transmit a plurality of sets of beacons. The AP comprises at least two antennas. The AP is adapted to provide a service set identifier (SSID) for each set of beacons and said AP is adapted to determine a set of transmit beamforming weights for each set of beacons of said plurality of sets of beacons; wherein each beacon of said set of beacons is adapted to provide said service set identifier (SSID) and said each beacon of said set of beacons is adapted to be transmitted using said set of transmit beamforming weights. In an embodiment, the set of transmit beamforming weights W are independent identically distributed random coefficients. The weights are of magnitude 1 and phase is a random variable φ that is uniformly distributed from –pi to pi radians. The AP is adapted to periodically transmit said each beacon of said set of beacons. The said AP is adapted to generate a plurality of received signal strengths corresponding to a plurality of sets of beacons at any location.

Figure 4:
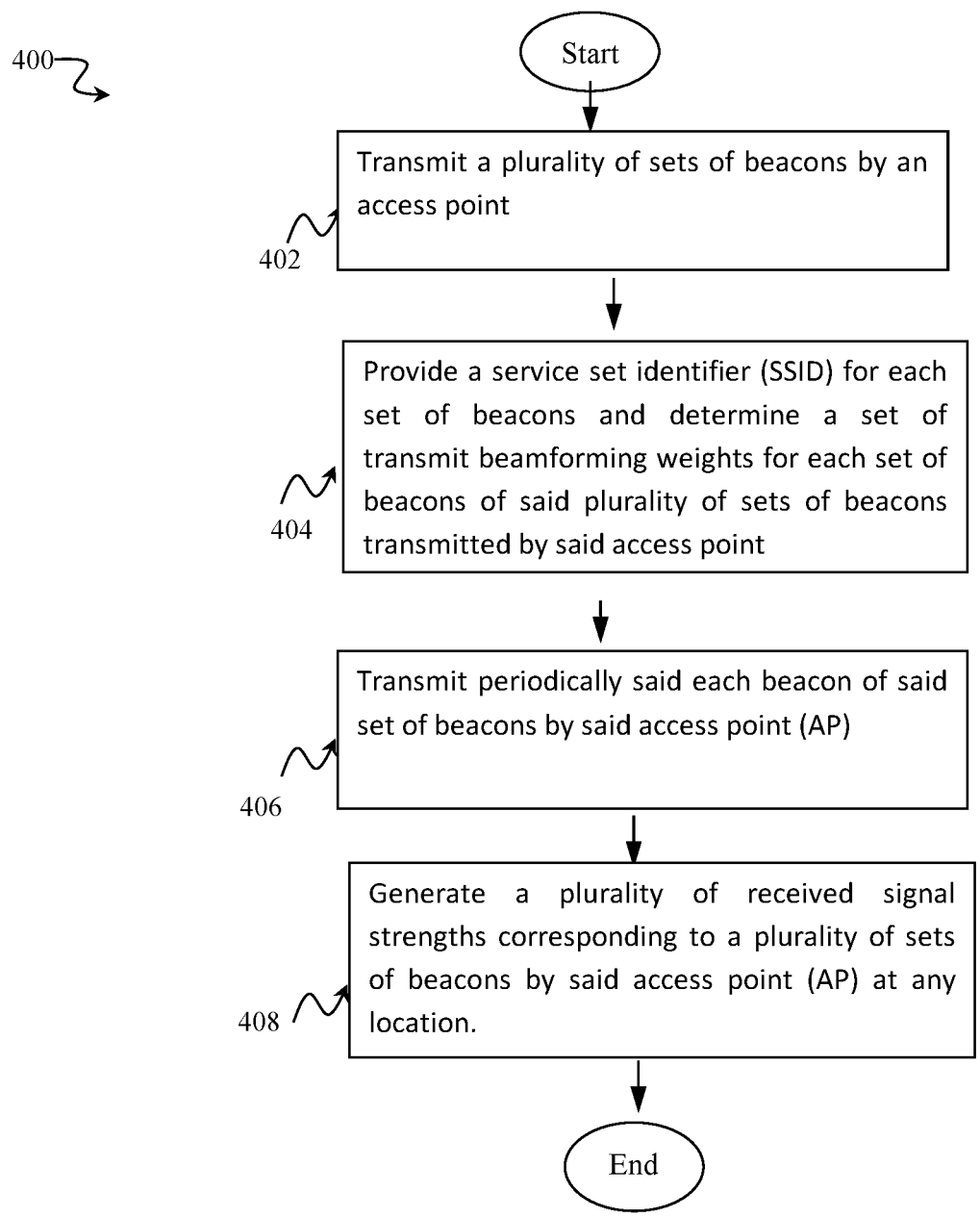
FIG. 4 illustrates a flowchart of a method for generating plurality of received signal strengths at any given location, where each physical AP is made to appear as multiple virtual APs in accordance with an embodiment of the present invention.

FIG. 4 illustrates a flowchart of a method 400 of generating a plurality of received signal strengths at any given location, where each physical AP is made to appear as multiple virtual APs in accordance with an embodiment of the present invention. At step 402, a plurality of sets of beacons are transmitted by an AP. The AP comprises at least two antennas. At step 404, a service set identifier (SSID) for each set of beacons is provided and a set of transmit beamforming weights is determined and applied for each set of beacons of said plurality of sets of beacons transmitted by said AP; wherein each beacon of said set of beacons is adapted to provide said service set identifier (SSID) and said each beacon of said set of beacons is adapted to be transmit using said set of transmit beamforming weights. The said set of transmit beamforming weights are independent identically distributed random coefficients. In an embodiment, the weights are of magnitude 1 and phase is a random variable φ that is uniformly distributed from –pi to pi radians. At step 406, said each beacon of said set of beacons is transmitted periodically by said AP. At step 408, a plurality of received signal strengths is generated corresponding to a plurality of sets of beacons by said AP at any location.

Figure 5:
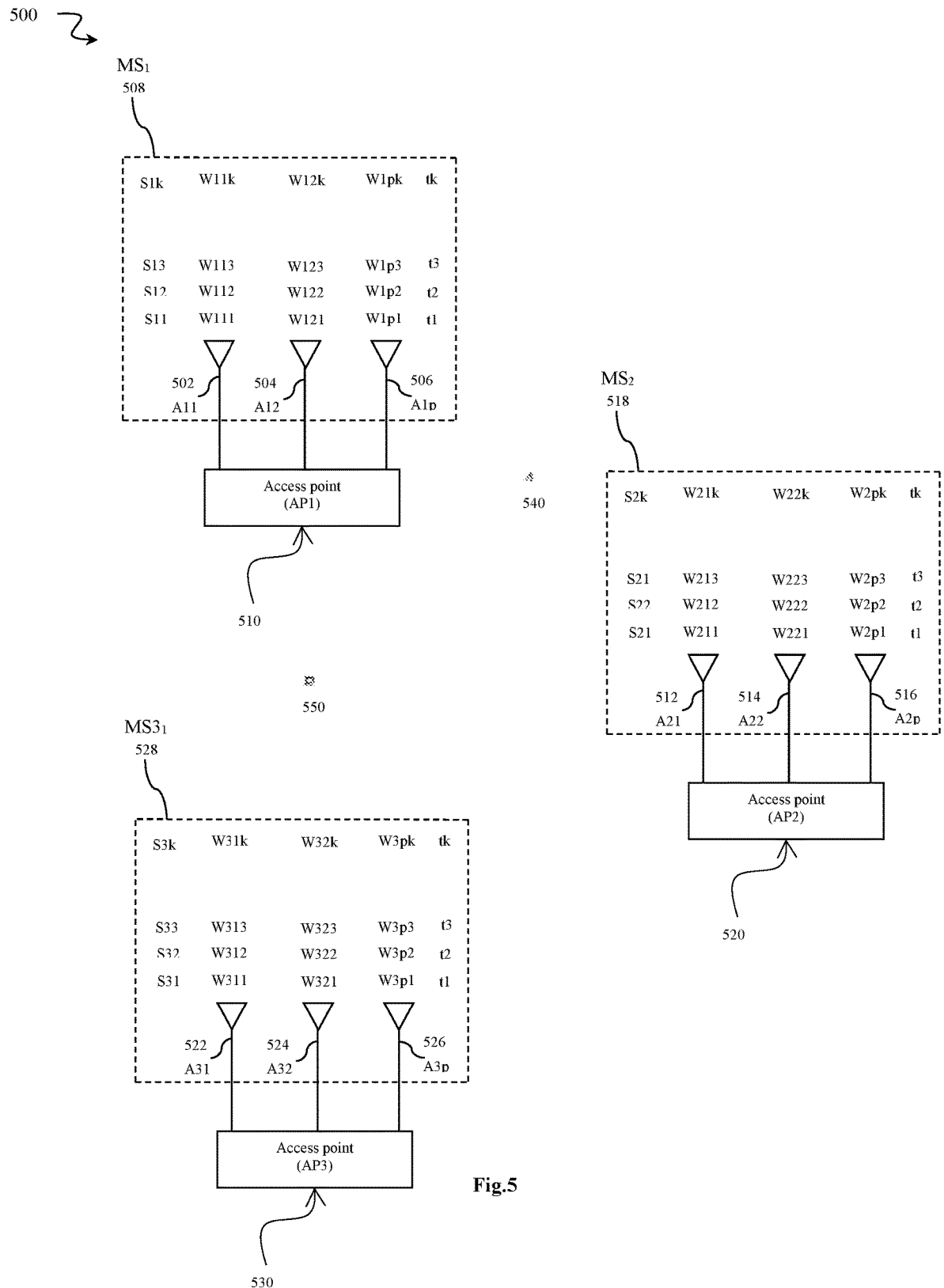
FIG. 5 illustrates a block diagram of an RTLS system of locating a tag, in accordance with an embodiment of the present invention.

FIG. 5 illustrates a block diagram of an RTLS system 500 in accordance with an embodiment of the present invention.

In an embodiment, the system comprises a plurality of APs, wherein each AP has at least one antenna and at least one AP has at least two antennas. As shown in FIG. 5, the system 500 comprises 3 APs namely AP1 510, AP2 520 and AP3 530. The number of APs is not limited to three APs as shown in the figure. It is shown only for explanation purpose. Each AP AP1 510, AP2 520 and AP3 530 has a plurality p of antennas. The AP AP1 510 has antennas namely A11 502, A12 504, . . . A1p 506, the AP AP2 520 has antennas namely A21 512, A22 514, . . . A2p 516, and the AP AP3 530 has antennas namely A31 522, A32 524, . . . A3p 526 as shown in the FIG. 5. A tag (wireless station) is attached to a moveable device to identify the (x,y) location of the moveable device from the n*k RSSI measurements it acquires. As shown in the FIG. 5, Tag A 540 is used to identify the device (shown at location 'A') and Tag B 550 is used to identify the device (shown at location 'B'). The number of tags is not limited to two as shown in the FIG. 5. It is shown only for explanation purpose.

A set of transmit beamforming weights is applied on the set of antennas of an AP during a time slot. Multiple sets of transmit beamforming weights are applied across a plurality of timeslots by an AP. A plurality of multiple sets of transmit beamforming weights are applied across a plurality of timeslots by a plurality of APs.

As shown in FIG. 5, in an embodiment, each of a plurality of multiple sets of transmit beamforming weights namely MS1 508 of an AP (AP1) 510 comprises multiple sets of transmit beamforming weights namely S11, S12, S13, . . . S1k across a plurality of timeslots namely t1, t2, t3, . . . tk. The set of transmit beamforming weights namely S11 comprising transmit beamforming weights namely W111, W121, . . . W1p1 is applied on the antennas of an AP, AP1 510, during a time slot t1. Similarly, another set of transmit beamforming weights namely S12 comprising transmit beamforming weights namely W112, W122, . . . W1p2 is applied on the antennas of an AP, AP1 510, during a time slot t2. Similarly, another set of transmit beamforming weights namely S13 comprising transmit beamforming weights namely W113, W123, . . . W1p3 is applied on the antennas of an AP, AP1 510, during a time slot t3. In this manner, another set of transmit beamforming weights namely S1k comprising transmit beamforming weights namely W11k, W12k, . . . W1pk is applied on the antennas of an AP, AP1, during a final time slot tk. The multiple set of transmit beamforming weights namely MS1 508 comprises multiple sets of transmit beamforming weights namely S11, S12, S13, . . . S1k, which are applied across a plurality of timeslots namely t1, t2, t3, . . . tk by an AP AP1 510.

In an embodiment, each of a plurality of multiple sets of transmit beamforming weights namely MS2 518 of an AP AP2 520 comprises multiple sets of transmit beamforming weights namely S21, S22, S23, . . . S2k which are applied across a plurality of timeslots namely t1, t2, t3, . . . tk. The set of transmit beamforming weights namely S21 comprising transmit beamforming weights namely W211, W221, . . . W2n1 is applied on the antennas of an AP, AP2 520, during a time slot t1 of an AP AP2 520. Similarly, another set of transmit beamforming weights namely S22 comprising transmit beamforming weights namely W212, W222, . . . W2p2 applied on the antennas of an AP, AP2 520, during a time slot t2. Similarly, another set of transmit beamforming weights namely S13 comprising transmit beamforming weights namely W213, W223, . . . W2p3 is applied on the antennas of an AP, AP2 520, during a time slot t3. In this manner, another set of transmit beamforming weights namely S2k comprising transmit beamforming weights namely W21k, W22k, . . . W2pk is applied on the antennas of an AP, AP2 520, during a time slot tk.

In this manner, the multiple sets of transmit beamforming weights are applied across a plurality of timeslots namely t1, t2, t3, . . . tk by an AP.

TABLE 3

| | | Tag A at location 'A' | | | |
|---|---|---|---|---|---|
| S. No. | Time Slot | AP1 | AP2 | . . . | APk |
| 1 | t1 | $RSSI\_A_{11}$ | $RSSI\_A_{21}$ | | $RSSI\_A_{n1}$ |
| 2 | t2 | $RSSI\_A_{12}$ | $RSSI\_A_{22}$ | | $RSSI\_A_{n2}$ |
| 3 | t3 | $RSSI\_A_{13}$ | $RSSI\_A_{23}$ | | $RSSI\_A_{n3}$ |

TABLE 3-continued

Tag A at location 'A'

| S. No. | Time Slot | AP1 | AP2 | ... | APk |
|---|---|---|---|---|---|
| ⋮ | ⋮ | ⋮ | ⋮ |  | ⋮ |
| P | tp | $RSSI\_A_{1k}$ | $RSSI\_A_{2k}$ |  | $RSSI\_A_{nk}$ |

As shown in the table 3, at time slot t1, at location 'A', the AP $AP_1$ generates an RSSI $RSSI\_A_{11}$ at STA and the AP $AP_2$ generates an RSSI $RSSI\_A_{21}$ at STA. Similarly, the AP $AP_n$ generates an RSSI $RSSI\_A_{n1}$ at the STA at location 'A'. At time slot t2, at location 'A', the AP $AP_1$ generates an RSSI at the STA of $RSSI\_A_{11}$ and the AP AP2 generates an RSSI $RSSI\_A_{22}$. Similarly, the AP $AP_n$ generates an RSSI at the STA of $RSSI\_A_{n2}$ at location 'A'. At time slot t3, at location 'A', the AP $AP_1$ generates at the STA an RSSI $RSSI\_A_{13}$ and the AP $AP_2$ generates an RSSI at the STA of $RSSI\_A_{23}$. Similarly, the AP $AP_n$ generates an RSSI $RSSI\_A_{n3}$ at location 'A'. In this manner, at time slot tk, the AP $AP_1$ generates an RSSI $RSSI\_A_{1k}$ and the AP $AP_2$ generates an RSSI $RSSI\_A_{2k}$. Similarly the AP $AP_n$ generates at the STA an RSSI $RSSI\_A_{nk}$ at location 'A'.

TABLE 4

Tag B at location 'B'

| S. No. | Time Slot | AP1 | AP2 | ... | APn |
|---|---|---|---|---|---|
| 1 | t1 | $RSSI\_B_{11}$ | $RSSI\_B_{21}$ |  | $RSSI\_B_{n1}$ |
| 2 | t2 | $RSSI\_B_{12}$ | $RSSI\_B_{22}$ |  | $RSSI\_B_{n2}$ |
| 3 | t3 | $RSSI\_B_{13}$ | $RSSI\_B_{23}$ |  | $RSSI\_B_{n3}$ |
| ⋮ | ⋮ | ⋮ | ⋮ |  | ⋮ |
| P | tk | $RSSI\_B_{1k}$ | $RSSI\_B_{2k}$ |  | $RSSI\_B_{nk}$ |

As shown in the table 4, at time slot t1, at location 'B', the AP $AP_1$ generates at the STA an RSSI $RSSI\_B_{11}$ and the AP AP2 generates an RSSI $RSSI\_B_{21}$. Similarly the AP $AP_n$ generates at the STA an RSSI $RSSI\_B_{n1}$ at location 'B'. At time slot t2, at location 'B', the AP AP1 generates an RSSI $RSSI\_B_{12}$ and the AP AP2 generates an RSSI $RSSI\_B_{22}$. Similarly the AP APn generates an RSSI $RSSI\_B_{2k}$ at location 'B'. At time slot t3, at location 'B', the AP AP1 generates at the station an RSSI $RSSI\_B_{13}$ and the AP AP2 generates a an RSSI $RSSI\_B_{23}$. Similarly the AP APn transmits a radiated power which generates an RSSI at the receiver of $RSSI\_B_{n3}$ at location 'B'. In this manner, at time slot tk, at location 'B', the AP AP1 generates a radiation pattern which generates at the station an RSSI $RSSI\_B_{1k}$ and the AP AP2 generates an RSSI $RSSI\_B_{2k}$. Similarly the AP $AP_n$ generates an RSSI $RSSI\_B_{nk}$ at location 'B'.

A system for locating a tag corresponding to plurality of APs is described. The system comprises a plurality of APs, wherein each AP is adapted to transmit using multiple sets of transmit beamforming weights corresponding to a plurality of timeslots. The said AP comprises at least two antennas. Each AP is operative to communicate with at least one of said plurality APs whereby time synchronization of timeslots is established and maintained. The said each AP is adapted to transmit a signal using said multiple sets of transmit beamforming weights associated with said plurality of timeslots. In an embodiment, each time slot duration is 500 milliseconds (ms). The said each AP is adapted to generate a plurality of RSSI fingerprints corresponding to said plurality of timeslots associated with said multiple sets of transmit beamforming weights. The said tag which is to be located, is adapted to measure a plurality of RSSIs corresponding to said multiple sets of transmit beamforming weights associated with said plurality of timeslots corresponding to said each AP. A location engine is configured to determine a location of the tag in known ways using said plurality of fingerprints and said plurality of RSSIs. In an embodiment a legacy location engine is adapted to simply treat the additional fingerprints obtained across the timeslots, and the additional RSSIs obtained from the tag, as if they belong to additional APs. This way, its core operation and algorithm remain similar, but with increased number of fingerprint & RSSI inputs to obtain better location accuracy. The modifications to an existing or legacy RTLS location engine is therefore not major, but the result is higher accuracy.

In an embodiment, the set of transmit beamforming weights are independent identically distributed circular complex Gaussian random variables. The weights are of magnitude 1 and phase is a random variable that is uniformly distributed from -pi to pi radians. A different realization of these set of transmit beamforming weights is used across different timeslots. The said tag is attached to a device to identify the location of the device.

Figure 6:
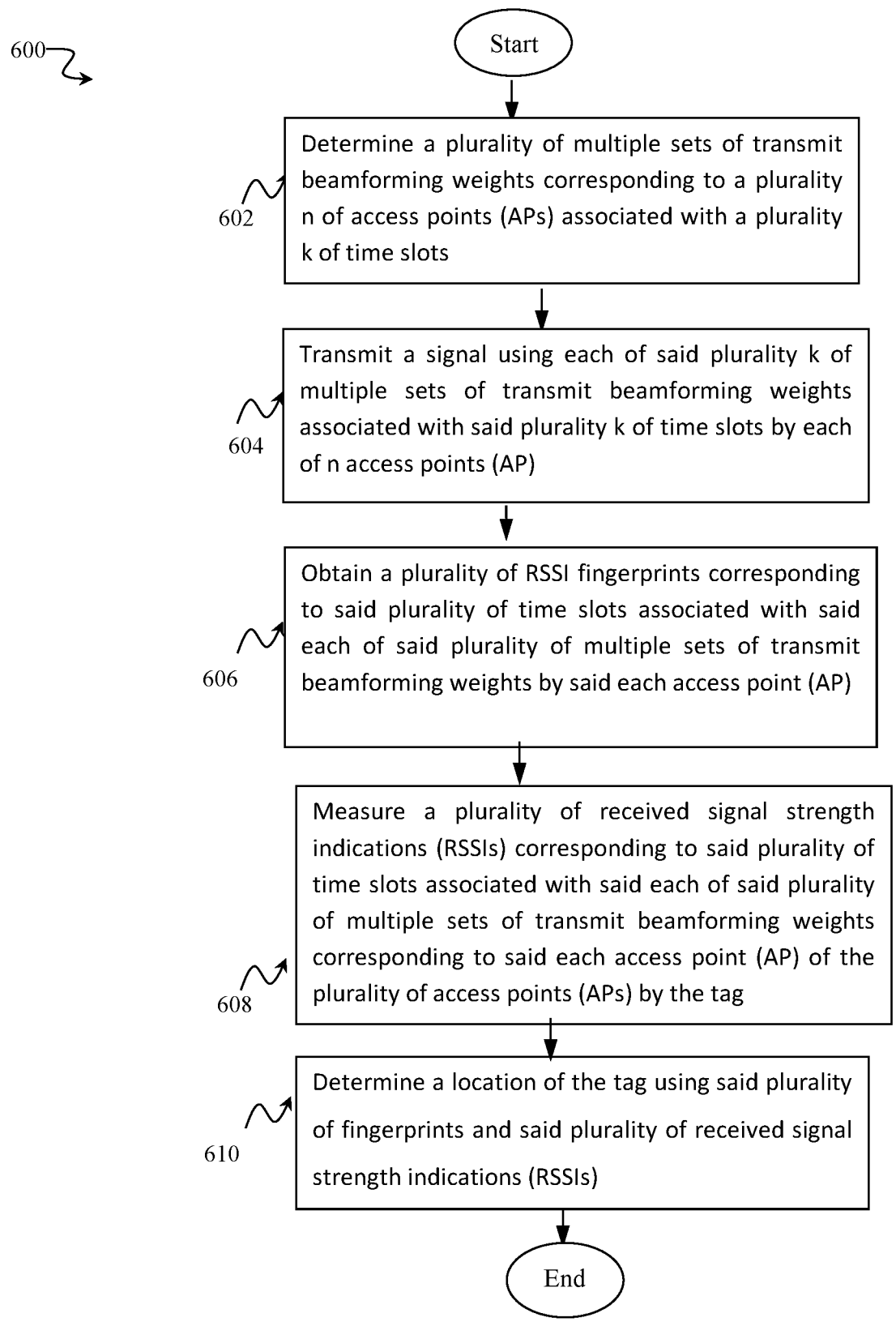
FIG. 6 illustrates a flowchart of a method of locating a tag, in accordance with an embodiment of the present invention.

FIG. 6 illustrates a flowchart of a method 600 of locating a tag, in accordance with an embodiment of the present invention. At step 602, a plurality of multiple sets of transmit beamforming weights corresponding to a plurality of APs associated with a plurality of timeslots is determined. Each of said plurality of multiple sets of transmit beamforming weights corresponds to each AP of the plurality APs. The AP comprises at least two antennas. Each AP is operative to communicate with at least one of said plurality APs whereby time synchronization of timeslots is established and maintained. The said plurality of timeslots is associated with said each AP of the plurality APs. Each of said plurality of multiple sets of transmit beamforming weights is associated with said plurality of timeslots corresponding to said each AP; wherein each of multiple sets of transmit beamforming weights of said plurality of multiple sets of transmit beamforming weights is associated with each time slot of said plurality of timeslots corresponding to said each AP of the plurality APs. Each time slot duration is 500 milliseconds (ms). In an embodiment, the set of transmit beamforming weights are independent identically distributed circular complex Gaussian random variables. The weights are of magnitude 1 and phase is a random variable φ that is uniformly distributed from -pi to pi radians. A different realization of these set of transmit beamforming weights is used across different timeslots.

At step 604, a signal using said each of said plurality of multiple sets of transmit beamforming weights associated with said plurality of timeslots by said each AP of the plurality of APs is transmitted. Thereby, at step 606, a plurality of RSSI fingerprints corresponding to said plurality of timeslots associated with said each of said plurality of multiple sets of transmit beamforming weights by said each AP of the plurality of APs is obtained.

At step 608, a plurality of RSSIs corresponding to said plurality of timeslots associated with said each of said plurality of multiple sets of transmit beamforming weights corresponding to said each AP of the plurality of APs is measured by the tag. At step 610, a location of the tag using said plurality of fingerprints and said plurality of RSSIs is determined.

The tag which is to be located in (x,y) space is adapted to measure a plurality of RSSIs corresponding to the multiple sets of transmit beamforming weights associated with said plurality of timeslots corresponding to said each AP. A location engine is configured to determine a location of the tag using said plurality of fingerprints and said plurality of RSSIs. In an embodiment a legacy location engine is adapted to simply treat the additional fingerprints obtained across the timeslots, and the additional RSSIs obtained from the tag, as if they belong to additional APs. This way, its core operation and algorithm remain similar, but with increased number of fingerprint & RSSI inputs to obtain better location accuracy. The modifications to an existing or legacy RTLS location engine is therefore not major, but the result is higher accuracy.

This invention allows an RTLS system to have a fewer wireless devices, in context of WLAN, APs (or reduced & low-cost version of the APs), for a given accuracy. Alternatively, the invention allows and provides a higher accuracy for the same number of physical APs.

Having described and illustrated the principles of the invention with reference to described embodiments, it will be recognized that the described embodiments may be modified in arrangement and detail without departing from such principles.

In view of the many possible embodiments to which the principles of the invention may be applied, we claim the invention as all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

The detailed description is presented to enable a person of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

I claim:

1. A method for a receiver to determine its location using Received Signal Strength Indicator (RSSI) values received from the transmissions of a plurality of access points (APs), each of the APs having two or more antennas for transmitting beacon frames, the method comprising:
    each of the APs transmitting a beacon frame during a periodic beacon frame time slot, each transmitted beacon frame modified in succession by a canonical beamforming sequence of beamforming coefficients, each beamforming coefficient applied to a beacon frame during each particular beacon frame timeslot, each beamforming coefficient modifying the amplitude or phase of the beacon frame transmitted to each antenna of an associated access point (AP);
    the beamforming sequences selected to form a unique two dimensional set of receive signal strengths over an (x,y) coordinate space forming a field intensity which is other than directional, thereby allowing a receiver to determine a location in the (x,y) coordinate space from the signal strength received from two or more of the plurality of APs; and,
    wherein the beamforming coefficients are a sequence of coefficients having at least one of a random real component or a random imaginary component.

2. The method of claim 1, wherein each coefficient of the sequence of coefficients further comprises a unity amplitude.

3. The method of claim 1, wherein the periodic beacon frame timeslot has a 500 milliseconds (ms) interval.

4. The method of claim 1, wherein said number of antennas at each AP is at least two antennas.

5. The method of claim 1, wherein each said AP is operative to communicate with at least one of said plurality of APs.

6. The method of claim 1 wherein each said AP is operative to transmit a beacon frame containing a service set identifier (SSID).

7. A method for locating a tag, the tag receiving beacon frame signals from a plurality of access points (APs), each access point (AP) having a plurality of transmit antennas, the method comprising:
    each of the APs transmitting a sequence of beacon frames, each beacon frame transmitted in a sequence of beacon frame timeslots, each of the beacon frames transmitted using a unique beamforming matrix which is operative to adjust the transmit phase to the antennas to form a radiation pattern which, combined with the radiation patterns of other APs, provides a unique map of an (x,y) coordinate space by signal strength during each beacon frame timeslot of transmission;
    the beamforming matrix comprising a sequence of coefficients comprising a real component and an imaginary component, the real component and imaginary component selected to be a sequence of random coefficients to produce an other than directional field pattern, each random coefficient of the sequence having unity amplitude; and,
    the tag operative to determine a received signal strength indication (RSSI) from at least two of the APs to determine a location of the tag in the (x,y) coordinate space.

8. The method of claim 7, wherein the random coefficient is from a pseudo-random phase sequence with unity amplitude.

9. The method of claim 7, wherein the interval of the beacon frame timeslots has a duration of 500 milliseconds (ms).

10. The method of claim 7, wherein said plurality of antennas comprises at least two antennas.

11. The method of claim 7, wherein said each AP is operative to communicate with at least one of said plurality of APs.

12. A system for generating a plurality of received signal strength indication (RSSI) for use by a receiver determining its position with respect to a plurality of access points (APs), said system comprising:
    a plurality of APs, wherein each access point (AP) is adapted to transmit a sequence of beacon frames, each beacon frame having a modified phase applied to each of a plurality of transmit antennas, the modified phase applied to each antenna generated by multiplying the beacon frame with a beamsteering matrix to form a different complex radiation pattern for each beacon transmit event, the beamsteering matrix comprising a series of random coefficients, the random coefficients further comprising a real component and an imaginary component;

each AP operative to transmit its respective sequence of beacon frames during a beacon frame timeslot when other APs are not transmitting beacon frames;

a receiving station receiving each plurality of beacon frame sequences from the plurality of APs, the receiving station associating a receive signal strength indication (RSSI) with each received beacon frame; and, a location resolver operative to compare each RSSI with a fingerprint map for best match to an (x,y) location to resolve a location of the receiver.

13. The system of claim 12, wherein each of the coefficients comprise a coefficient from a pseudo-random phase sequence with unity amplitude.

14. The system of claim 13, wherein for each AP, each pseudo-random coefficient of the pseudo-random phase sequence is associated with a particular beacon frame timeslot.

15. The system of claim 14, wherein the beacon frame timeslot interval is 500 milliseconds (ms).

16. The system of claim 12, wherein each said AP comprises at least two antennas.

17. The system of claim 12, wherein said each AP is operative to communicate with at least one of said plurality of APs.

18. The system of claim 12 wherein:
each said AP is adapted to transmit said beacon frames at periodic intervals during each said beacon frame timeslot;
each said beacon frame adapted to provide a service set identifier (SSID).

19. A system for a tag receiver determining a tag receiver location from beacon frames received by the tag receiver, the system comprising:

a plurality of access points (APs), each access point (AP) transmitting a repeating sequence of beacon frames, each beacon frame in a succession of periodic beacon frame timeslots, each AP having a plurality of antennas, the plurality of antennas coupled to a transmitter through a beamsteering matrix having a canonical series of values in a succession, the beamsteering matrix modifying the transmit amplitude and phase for each associated antenna using a coefficient having a real component and imaginary component for each of the beacon frame timeslots to generate a non-directional complex radiation profile for each beacon transmit event;

the beamsteering matrix further comprising a series of random coefficients; and, the tag receiver associating a received signal strength indication (RSSI) from each of the received beacon frames, establishing a fingerprint of RSSIs for each AP and sequence of beacon frames, and finding a closest match to a location from the RSSI fingerprint.

20. The system of claim 19, where each random coefficient is from a sequence of unity amplitude coefficients with pseudo-random phase.

21. The system of claim 20, where each random coefficient has unity amplitude.

22. The system of claim 20, wherein the fingerprint for comparison of RSSI measurements from the plurality of APs is done either by the receiver or at one of the APs receiving the RSSI measurements associated with a plurality of APs.

23. The system of claim 22, wherein the interval of a beacon frame timeslot is 500 milliseconds (ms).

24. The system of claim 19, wherein said plurality of AP antennas comprises at least two antennas.

25. The system of claim 19, wherein each said AP transmits an identifier with each beacon frame.

* * * * *